US011783247B2

(12) United States Patent
Srivastava et al.

(10) Patent No.: US 11,783,247 B2
(45) Date of Patent: *Oct. 10, 2023

(54) MACHINE LEARNING PLATFORM FOR REAL TIME OCCUPANCY FORECASTING AND RESOURCE PLANNING

(71) Applicant: Bank of America Corporation, Charlotte, NC (US)

(72) Inventors: Veerandra S. Srivastava, Plainsboro, NJ (US); Maharaj Mukherjee, Poughkeepsie, NY (US); Mehul Jayant Pandya, Pune Maharashtra (IN); Utkarsh Raj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/875,708

(22) Filed: Jul. 28, 2022

(65) Prior Publication Data

US 2022/0366337 A1    Nov. 17, 2022

Related U.S. Application Data

(63) Continuation of application No. 16/988,876, filed on Aug. 10, 2020, now Pat. No. 11,461,713.

(51) Int. Cl.
*G06Q 10/06* (2023.01)
*G06Q 10/0631* (2023.01)
(Continued)

(52) U.S. Cl.
CPC ... *G06Q 10/06312* (2013.01); *G06F 16/3344* (2019.01); *G06N 20/00* (2019.01); *G06Q 10/06313* (2013.01); *G07C 9/27* (2020.01)

(58) Field of Classification Search
None
See application file for complete search history.

(56) References Cited

U.S. PATENT DOCUMENTS 8,352,341 B1   1/2013  Greenberg et al.
9,176,485 B2  11/2015  Krumm et al.
(Continued)

OTHER PUBLICATIONS

Michael et al "Organizational Design and Space: The Good, the Bad, and the Productive", 2016, pp. 1-42 (Year: 2016).*

(Continued)

*Primary Examiner* — Romain Jeanty
(74) *Attorney, Agent, or Firm* — Banner & Witcoff, Ltd.

(57) ABSTRACT

Aspects of the disclosure relate to using machine learning for resource planning. A computing platform may detect an occupancy modification event for a physical space. Based on detecting the occupancy modification event, the computing platform may send commands directing display of a data collection prompt to end user devices, which may prompt for work to be performed by users of the end user devices in the physical space during a first day. Using natural language processing, the computing platform may analyze user input information and other occupancy data to determine whether or not the users of the end user devices have permission to occupy the physical space during the first day. The computing platform may cause the end user devices to display a resource management interface indicating whether or not the users of the end user devices have valid permission to physically occupy the physical space during the first day.

20 Claims, 10 Drawing Sheets

(51) Int. Cl.
*G06N 20/00* (2019.01)
*G07C 9/27* (2020.01)
*G06F 16/33* (2019.01)

(56) References Cited

U.S. PATENT DOCUMENTS

| | | | |
|---|---|---|---|
| 9,921,750 B2 | 3/2018 | Ghosh | |
| 10,153,113 B2 | 12/2018 | Richardson et al. | |
| 10,360,304 B1* | 7/2019 | Alvarez | G05B 15/02 |
| 10,489,731 B2 | 11/2019 | Fife | |
| 10,506,309 B2 | 12/2019 | Sullivan et al. | |
| 10,534,382 B2 | 1/2020 | Steinberg | |
| 10,572,834 B2 | 2/2020 | Mohan et al. | |
| 10,584,890 B2 | 3/2020 | Steinberg | |
| 10,586,185 B2 | 3/2020 | Bansal et al. | |
| 10,592,833 B2 | 3/2020 | Fife | |
| 10,607,147 B2 | 3/2020 | Raykov et al. | |
| 10,612,983 B2 | 4/2020 | Steinberg et al. | |
| 10,627,791 B2 | 4/2020 | Fadell et al. | |
| 10,637,239 B2 | 4/2020 | Neuenschwander | |
| 10,673,272 B2 | 6/2020 | Wilberforce | |
| 10,678,416 B2 | 6/2020 | Fadell et al. | |
| 10,690,369 B2 | 6/2020 | Matsuoka et al. | |
| 10,691,961 B2 | 6/2020 | Quaggin-Mitchell et al. | |
| 10,699,131 B2 | 6/2020 | Richardson et al. | |
| 10,706,297 B2 | 7/2020 | Quaggin-Mitchell et al. | |
| 2006/0224427 A1 | 10/2006 | Salmon | |
| 2007/0260506 A1 | 11/2007 | Fitzpatrick et al. | |
| 2014/0136458 A1* | 5/2014 | Levin | G06N 3/0427 706/21 |
| 2016/0162478 A1 | 6/2016 | Blassin et al. | |
| 2016/0285785 A1 | 9/2016 | Thye | |
| 2019/0354910 A1 | 11/2019 | Escapa et al. | |

OTHER PUBLICATIONS

Dec. 24, 2021—U.S. Office Action—U.S. Appl. No. 16/988,876.
Jun. 2022 078—U.S. Notice of Allowance—U.S. Appl. No. 16/988,876.
Jacqueline "Strategic Work-Space Planning", Oct. 1995, MIT Solan Management Review, pp. 1-35 (Year:1995).

* cited by examiner

405

Data Collection Interface

What tasks do you need to perform today?

(enter text here)

Data Collection Interface

Do you need to be in the office today?

Yes    No

Resource Management Interface

You're all clear - we'll see you in the office today!

Resource Management Interface

Based on your daily tasks, we request that you remain at home today. We'll see you soon!

FIG. 7

MACHINE LEARNING PLATFORM FOR REAL TIME OCCUPANCY FORECASTING AND RESOURCE PLANNING

CROSS REFERENCE TO RELATED APPLICATIONS

This application is a continuation of and claims priority to co-pending U.S. Application Ser. No. 16/988,876, filed Aug. 10, 2020, and entitled "Machine Learning Platform for Real Time Occupancy Forecasting and Resource Planning," which is incorporated herein by reference in its entirety.

BACKGROUND

Aspects of the disclosure relate to resource planning. In particular, one or more aspects of the disclosure relate to computing platforms that implement machine learning algorithms and datasets for resource planning.

In some cases, enterprise organizations may maintain a physical space that may typically be occupied by employees during an average workday. In some instances, it may be important to reduce or otherwise modify occupancy for the physical space for various reasons. It may be difficult, however, to identify optimal resource allocations in real time under the constraints of these necessary occupancy modifications across an entire enterprise. This difficulty may result in reduced enterprise efficiencies and/or may expose employees to safety risks and/or other risks.

SUMMARY

Aspects of the disclosure provide effective, efficient, scalable, and convenient technical solutions that address and overcome the technical problems associated with premises safety monitoring. For example, some aspects of the disclosure provide techniques that may enable computing devices to train a machine learning model using enterprise data, internal policy information, public data, or the like and to use the machine learning model to allocate resources in an optimal manner—both under the constraints of the model and based on user input information indicating availability information, task information, or the like for a plurality of enterprise users. Based on the analysis, the computing devices may provide graphical user interfaces indicating whether or not various individuals have valid permission to occupy a physical space (e.g., a floor in an office, an office building, or another space) and/or enforce these occupancy permissions by modifying enterprise security information based on the permissions. In doing so, various technical advantages may be realized. For example, one technical advantage is that an optimal resource allocation may be identified in real time across an enterprise organization. This may result in enterprise efficiencies and reduce risks for individuals planning to occupy the physical space on a particular day. Yet another technical advantage is that availability and/or daily work load may be evaluated in advance of individuals arriving at the physical space, thus resulting in a preemptive rather than reactive approach to resource planning. Yet another technical advantage is that applying such methods may dynamically manage resources on the fly, thus causing relatively minor disruptions (if any) to employee productivity. Furthermore, by applying such an approach to occupancy permissions for a physical location, confidence may be instilled for individuals visiting or otherwise occupying the physical location.

In accordance with one or more embodiments of the disclosure, a computing platform comprising at least one processor, a communication interface, and memory storing computer-readable instructions may monitor one or more data sources to detect an occupancy modification event corresponding to a physical space. Based on detecting the occupancy modification event, the computing platform may send data collection information and one or more commands directing one or more end user devices to display a data collection prompt based on the data collection information to the one or more end user devices, where the data collection prompt prompts for user input indicating task information indicating work to be performed by users of enterprise applications on the one or more end user devices in the physical space during a first day. The computing platform may receive user input information indicating the task information indicating the work to be performed by the users of the end user devices in the physical space during the first day. Using natural language processing (NLP), the computing platform may analyze the user input information and other stored occupancy data, which may result in resource management information indicating whether or not the users of the end user devices have valid permission to occupy the physical space during the first day. The computing platform may send, to the end user devices, the resource management information and one or more commands directing the one or more end user devices to display a resource management interface, where: 1) sending the resource management information and the one or more commands directing the one or more end user devices to display the resource management interface causes the one or more end user devices to display the resource management interface, and 2) the resource management interface indicates whether or not the users of the end user devices have valid permission to physically occupy the physical space during the first day.

In one or more instances, the occupancy modification event may include enterprise guidelines for office occupancy. In one or more instances, sending the data collection information and the one or more commands directing the one or more end user devices to display the data collection prompt based on the data collection information may include sending the data collection information and the one or more commands directing the one or more end user devices to display the data collection prompt based on the data collection information prior to arrival at the physical space for the first day.

In one or more instances, the data collection prompt may further prompt for user input indicating availability information for users of the one or more end user devices. In one or more instances, the computing platform may receive the user input information by: 1) receiving first user input at a first data collection prompt; 2) determining a second data collection prompt based on the first user input; 3) displaying the second data collection prompt; and 4) receiving a second user input at the second data collection prompt.

In one or more instances, the first user input and the second user input may be formatted as unstructured language information. In one or more instances, the computing platform may analyze the other stored occupancy by analyzing one or more of: project scheduling information, job roles, task information, or office floor plan information.

In one or more instances, the computing platform may send, to an enterprise security system, the resource management information and one or more commands directing the enterprise security system to update enterprise security information based on the resource management information, which may cause the enterprise security system to update the enterprise security information, where the enterprise security information indicates whether or not the users of the enterprise user devices have valid permission to badge into the physical space during the first day. In one or more instances, the enterprise security information may indicate that a first user does not have valid permission to badge into the physical space during the first day, and the enterprise security system may temporarily deactivate authentication permissions for a badge for the first user during the first day.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4-7 depict illustrative graphical user interfaces for implementing machine learning for real time occupancy forecasting and resource planning in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a simple, yet high-confidence, people counter mechanism to evaluate real time or near time occupancy of a floor. In some instances, infrared sensors may be used to count people, network internet protocol connections may be used to count devices, or the like. For example, a restriction on a number of resources on an office floor may be enforced per a specific set of guidelines. To do so, an employee may interact with a message based service. This may result in binary interactions with maximum outreach. For example, a decision of "go to work" or "do not go to work" may be made based on interactions with the message based service. In some instances, the message based service may include an evaluation disclaimer between the system and individual and/or prompt individuals for consent. In doing so, threshold occupancies may be more accurately observed, which may result in a quicker return to full capacity occupancy. Furthermore, in doing so, workplace safety may be ensured and data integrity/security may be maintained to benefit customers.

Figure 1A:
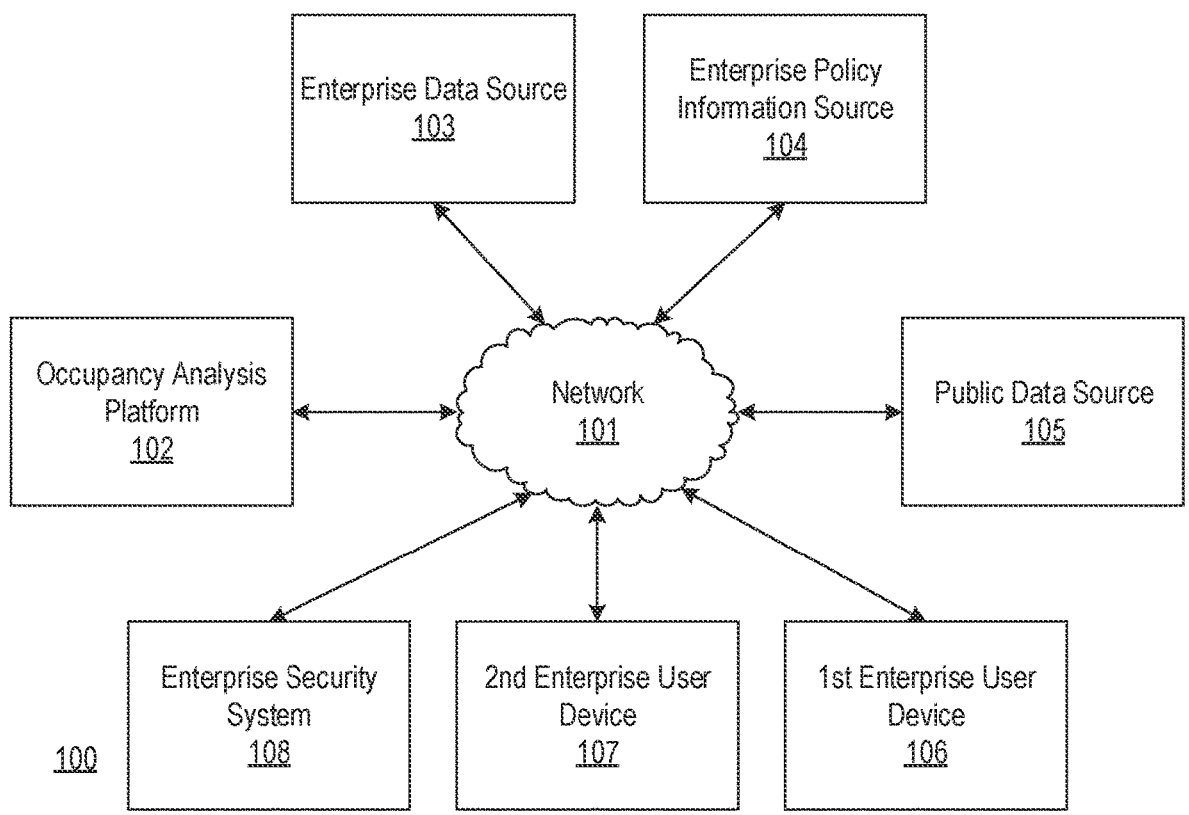
FIGS. 1A-1B depict an illustrative computing environment for implementing machine learning for real time occupancy forecasting and resource planning in accordance with one or more example embodiments.
Figure 1B:
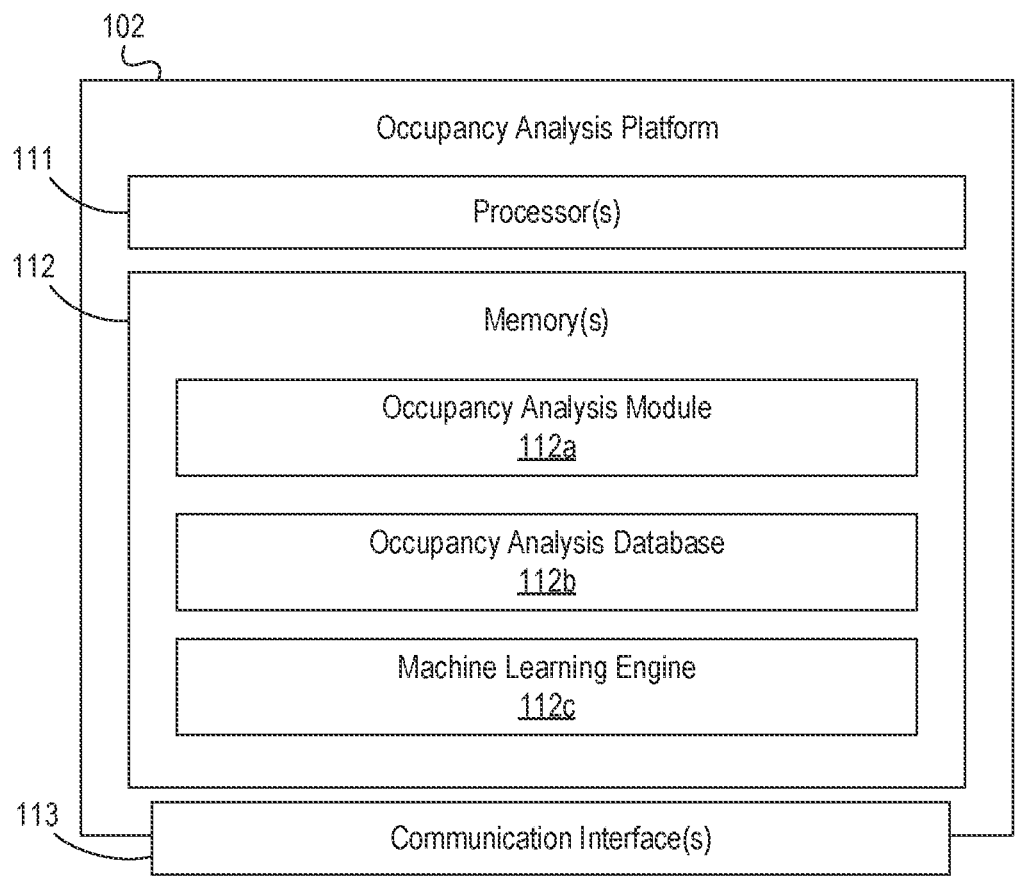

FIGS. 1A-1B depict an illustrative computing environment that implements machine learning for real time occupancy forecasting and resource planning in accordance with one or more example embodiments. Referring to FIG. 1A, computing environment 100 may include one or more computer systems. For example, computing environment 100 may include an occupancy analysis platform 102, enterprise data source 103, internal policy information source 104, public data source 105, first enterprise user device 106, second enterprise user device 107, and enterprise security system 108.

As described further below, occupancy analysis platform 102 may be a computer system that includes one or more computing devices (e.g., servers, server blades, or other systems) and/or other computer components (e.g., processors, memories, communication interfaces) that may be used to host and maintain an occupancy analysis model. In some instances, the occupancy analysis platform 102 may be configured to train the occupancy analysis model using enterprise data (e.g., job roles, task information, floor plan layout, project scheduling information, facility condition, number of total employees, or the like), internal policy information (e.g., internal enterprise occupancy guidelines, or the like), public data (e.g., a number of individuals at the geolocation, or the like), or the like. In some instances, the occupancy analysis platform 102 may be configured to monitor one or more data sources to identify an occupancy modification event (e.g., changing guidelines, policies, or other rules that may affect occupancy). In these instances, the occupancy analysis platform 102 may be configured to analyze availability and/or task information received from a user (e.g., an employee of an enterprise organization, or the like) based on the enterprise data, internal policy information, public data, or the like, in real time, to provide automated occupancy alerts, notifications, or the like. In some instances, the occupancy analysis platform 102 may be configured to dynamically update the occupancy analysis model as additional data and/or feedback is received.

Enterprise data source 103 may include one or more computing devices and/or other computer components (e.g., processors, memories, communication interfaces). In addition, enterprise data source 103 may be configured to store enterprise data such as job roles, task information, floor plan layout, project scheduling information, or the like, and to send such enterprise data to the occupancy analysis platform 102 for analysis.

Internal policy information source 104 may include one or more computing devices and/or other computer components (e.g., processors, memories, communication interfaces). In addition, the internal policy information source 104 may be configured to store internal policy information such as internal occupancy guidelines, or other internal policies for an enterprise organization corresponding to the occupancy analysis platform.

Public data source 105 may include one or more computing devices and/or other computer components (e.g., processors, memories, communication interfaces). In addition, the public data source 105 may be configured to store public data such as a count of individuals at a geolocation, or the like, and may be configured to send such public data to the occupancy analysis platform 102 for analysis.

First enterprise user device 106 may be a mobile device, tablet, smartphone, or the like that may be used by an individual such as an employee of an enterprise organization (e.g., a financial institution, or the like). For example, the first enterprise user device 106 may be used by one or more individuals to communicate (e.g., using a question and answer messaging service, or the like) with the occupancy analysis platform 102 to provide information related to availability, task information, or the like and to receive resource management information accordingly. In some instances, first enterprise user device 106 may be configured to display one or more user interfaces (e.g., resource management interfaces, or the like).

Second enterprise user device 107 may be a mobile device, tablet, smartphone, or the like that may be used by an individual such as an employee of an enterprise organization (e.g., a financial institution, or the like). For example, the second enterprise user device 107 may be used by one or more individuals to communicate (e.g., using a question and answer messaging service) with the occupancy analysis platform 102 to provide information related to availability, task information, or the like and to receive resource management information accordingly. In some instances, second enterprise user device 107 may be configured to display one or more user interfaces (e.g., resource management interfaces, or the like).

Enterprise security system 108 may be a computer system that includes one or more computing devices (e.g., servers, server blades, or the like) and/or other computer components (e.g., processors, memories, communication interfaces). In some instances, enterprise security system 108 may be used to control access permissions to a physical space of an enterprise organization (e.g., badging sensors for an office building, or the like). In these instances, the enterprise security system 108 may be configured to receive resource management information, and to modify access permissions accordingly.

Computing environment 100 also may include one or more networks, which may interconnect occupancy analysis platform 102, enterprise data source 103, internal policy information source 104, public data source 105, first enterprise user device 106, second enterprise user device 107, enterprise security system 108, or the like. For example, computing environment 100 may include a network 101 (which may interconnect, e.g., occupancy analysis platform 102, enterprise data source 103, internal policy information source 104, public data source 105, first enterprise user device, second enterprise user device 107, enterprise security system 108, or the like).

In one or more arrangements, occupancy analysis platform 102, enterprise data source 103, internal policy information source 104, public data source 105, first enterprise user device 106, second enterprise user device 107, and/or enterprise security system 108 may be any type of computing device capable of sending and/or receiving requests and processing the requests accordingly. For example, occupancy analysis platform 102, enterprise data source 103, internal policy information source 104, public data source 105, first enterprise user device 106, second enterprise user device 107, enterprise security system 108, and/or the other systems included in computing environment 100 may, in some instances, be and/or include server computers, desktop computers, laptop computers, tablet computers, smart phones, radio frequency identification (RFID) access sensors, or the like that may include one or more processors, memories, communication interfaces, storage devices, and/or other components. As noted above, and as illustrated in greater detail below, any and/or all of occupancy analysis platform 102, enterprise data source 103, internal policy information source 104, public data source 105, first enterprise user device 106, second enterprise user device 107, and/or enterprise security system 108, may, in some instances, be special-purpose computing devices configured to perform specific functions.

Referring to FIG. 1B, occupancy analysis platform 102 may include one or more processors 111, memory 112, and communication interface 113. A data bus may interconnect processor 111, memory 112, and communication interface 113. Communication interface 113 may be a network interface configured to support communication between occupancy analysis platform 102 and one or more networks (e.g., network 101, or the like). Memory 112 may include one or more program modules having instructions that when executed by processor 111 cause occupancy analysis platform 102 to perform one or more functions described herein and/or one or more databases that may store and/or otherwise maintain information which may be used by such program modules and/or processor 111. In some instances, the one or more program modules and/or databases may be stored by and/or maintained in different memory units of occupancy analysis platform 102 and/or by different computing devices that may form and/or otherwise make up occupancy analysis platform 102. For example, memory 112 may have, host, store, and/or include occupancy analysis module 112a, occupancy analysis database 112b, and a machine learning engine 112c.

Occupancy analysis module 112a may have instructions that direct and/or cause occupancy analysis platform 102 to execute advanced machine learning techniques to provide one or more occupancy analysis functions, such as resource planning based on availability information, task information, or the like, as discussed in greater detail below. Occupancy analysis database 112b may store information used by occupancy analysis module 112a and/or occupancy analysis platform 102 in application of advanced machine learning techniques to provide one or more occupancy analysis functions, and/or in performing other functions. Machine learning engine 112c may have instructions that direct and/or cause the occupancy analysis platform 102 to set, define, and/or iteratively refine optimization rules and/or other parameters used by the occupancy analysis platform 102 and/or other systems in computing environment 100.

Figure 2A:
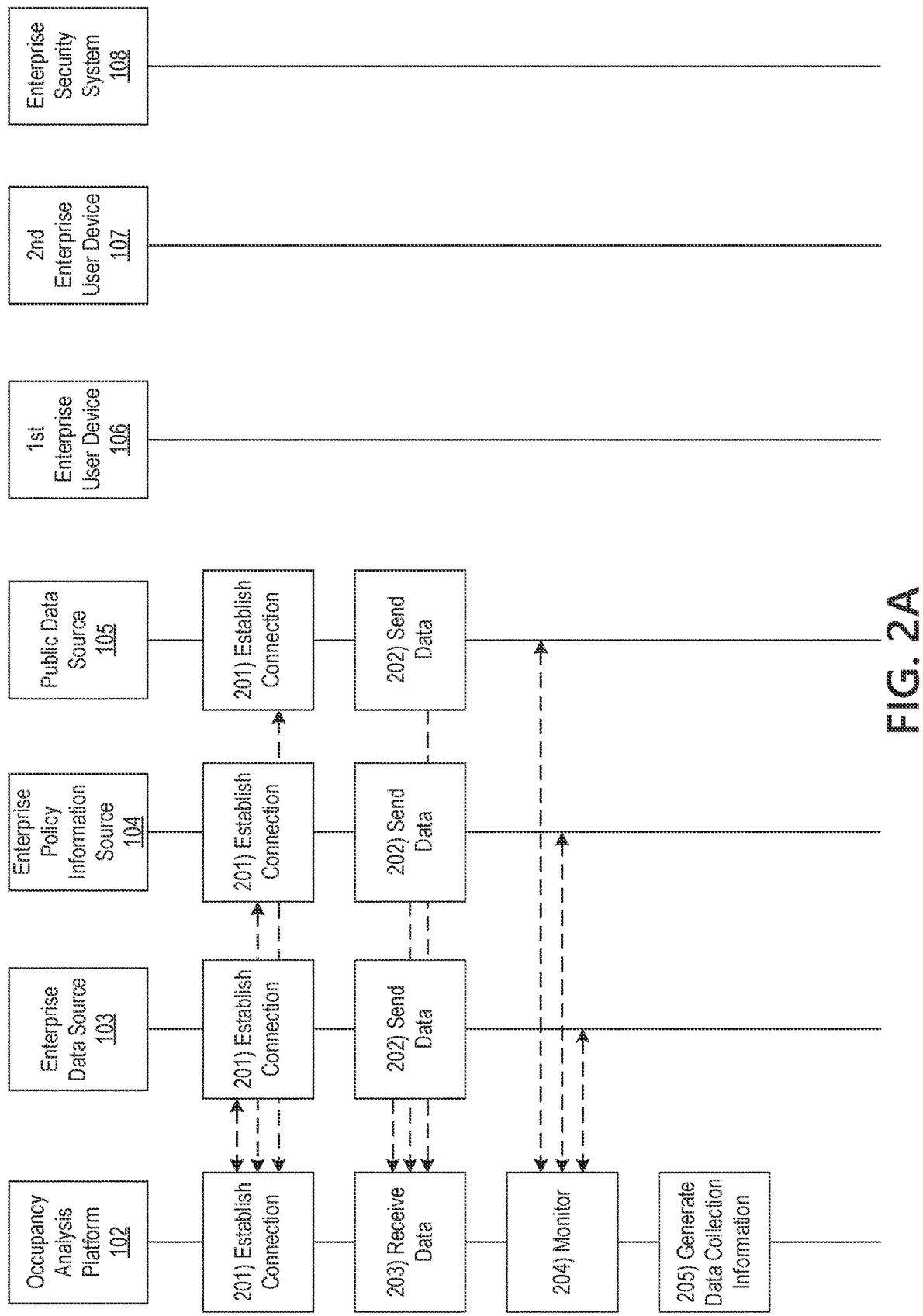
FIGS. 2A-2E depict an illustrative event sequence for implementing machine learning for real time occupancy forecasting and resource planning in accordance with one or more example embodiments.

FIGS. 2A-2E depict an illustrative event sequence that implements machine learning for real time occupancy forecasting and resource planning in accordance with one or more example embodiments. Referring to FIG. 2A, at step 201, the occupancy analysis platform 102 may establish connections with one or more data sources. For example, the occupancy analysis platform 102 may establish first, second, and/or third wireless data connections with the enterprise data source 103, the internal policy information source 104, and/or the public data source 105 to link the occupancy analysis platform 102 to the enterprise data source 103, the internal policy information source 104, and/or the public data source 105 (e.g., in preparation for receiving enterprise data, internal policy information, and/or public data). In some instances, the occupancy analysis platform 102 may identify whether or not a connection is already established with the enterprise data source 103, the internal policy information source 104, and/or the public data source 105. If connections are already established with the enterprise data source 103, the internal policy information source 104, and/or the public data source 105, the occupancy analysis platform 102 might not re-establish the respective connections. If connections are not yet established with the enterprise data source 103, the internal policy information source 104, and/or the public data source 105, the occupancy analysis platform may establish the first, second, and/or third wireless data connection as described herein.

At step 202, the enterprise data source 103, internal policy information source 104, and/or public data source 105 may send, share, or otherwise provide data to the occupancy analysis platform 102. For example, the enterprise data source 103 may send enterprise data indicating job roles, task information, floor plan layout, project scheduling information, or the like. As another example, internal policy information source 104 may send data indicating internal enterprise occupancy policies (e.g., for an enterprise organization corresponding to the occupancy analysis platform), or the like. In some instances, the enterprise data source 103, internal policy information source 104, and/or public data source 105 may send the enterprise data, internal policy information, and/or public data to the occupancy analysis platform 102 while the first, second, and/or third wireless data connections are respectively established.

At step 203, the occupancy analysis platform 102 may receive or otherwise access the enterprise data, internal policy information, and/or public data sent at step 202. For example, the occupancy analysis platform 102 may receive the enterprise data, internal policy information, and/or public data via the communication interface 113 and while the first, second, and/or third wireless data connections are respectively established.

Although the sending and receiving of data is illustrated and described at steps 202 and 203, thus is for illustrative purposes, and the sending and receiving of such data may be continually performed (e.g., in real time, at periodic intervals, or the like) throughout the described event sequence without departing from the scope of the disclosure described herein.

At step 204, the occupancy analysis platform 102 may monitor the enterprise data source 103, the internal policy information source 104, the public data source 105, or the like, to detect a resource modification event. For example, in detecting the resource modification event, the occupancy analysis platform 102 may detect data indicating that an occupancy level for a physical space corresponding to an enterprise organization associated with the occupancy analysis platform 102 should be modified. For example, the occupancy analysis platform 102 may detect new internal enterprise occupancy guidelines indicating that office occupancy levels should be reduced by 50%, or the like. As another example, the occupancy analysis platform 102 may detect enterprise internal policy information indicating that individuals should not be placed at workstations within a predetermined distance of each other, or the like.

At step 205, the occupancy analysis platform 102 may generate data collection information and one or more commands directing the first enterprise user device 106 and/or the second enterprise user device 107 to display a data collection interface based on the data collection information. In some instances, the occupancy analysis platform 102 may generate the data collection information and the one or more commands directing the first enterprise user device 106 and/or the second enterprise user device 107 to display a data collection interface based on the data collection information based on or in response to detecting the resource modification event at step 204.

Figure 2B:
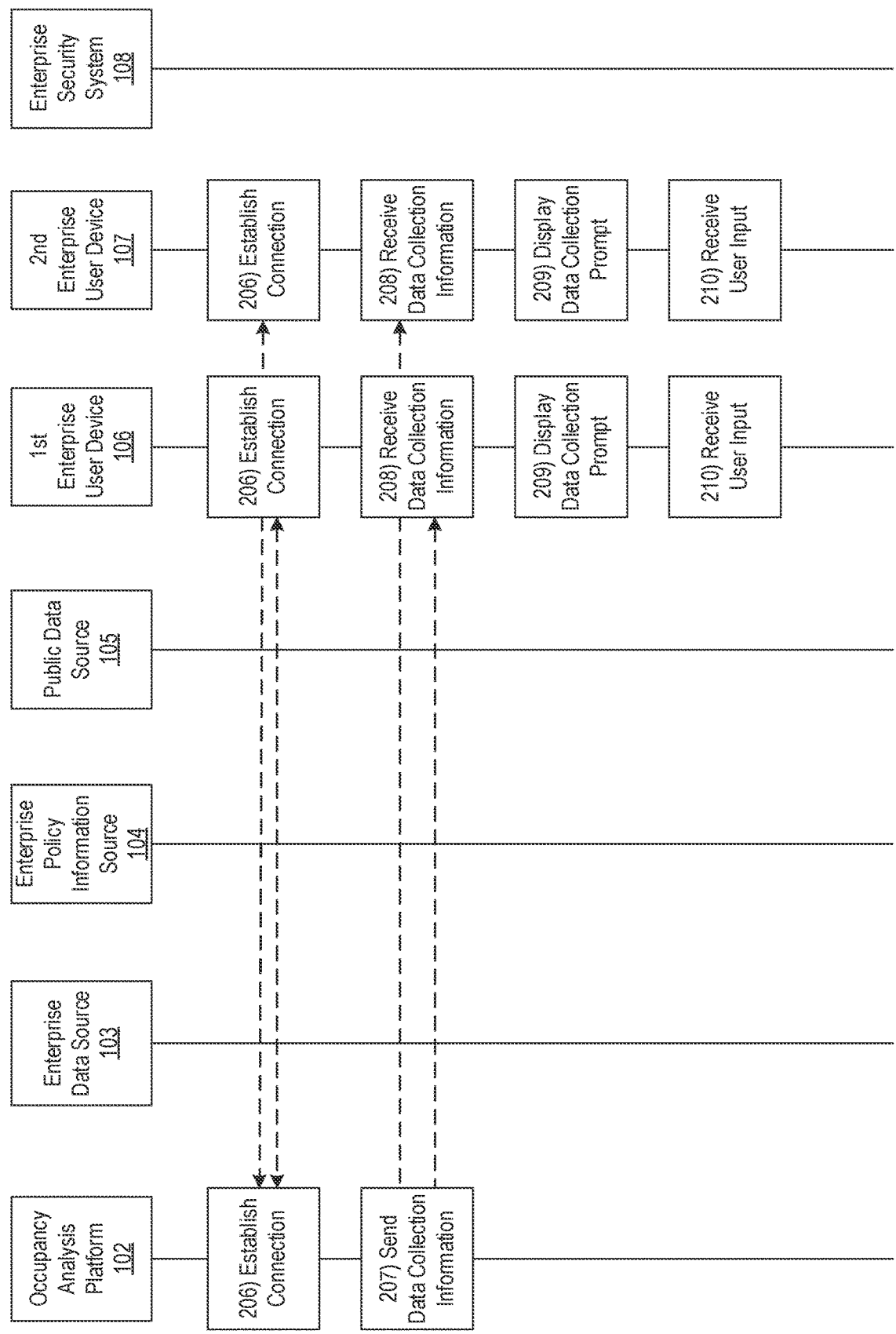

Referring to FIG. 2B, at step 206, the occupancy analysis platform 102 may establish connections with the first enterprise user device 106 and/or the second enterprise user device 107. For example, the occupancy analysis platform 102 may establish fourth and/or fifth wireless data connections with the first enterprise user device 106 and/or the second enterprise user device 107 to link the occupancy analysis platform 102 to the first enterprise user device 106 and/or second enterprise user device 107 (e.g., in preparation for sending the data collection information).

At step 207, the occupancy analysis platform 102 may send, share, or otherwise provide the data collection information and the one or more commands directing the first enterprise user device 106 and/or the second enterprise user device 107 to display a data collection interface based on the data collection information. For example, the occupancy analysis platform 102 may send the data collection information and the one or more commands directing the first enterprise user device 106 and/or the second enterprise user device 107 to display a data collection interface based on the data collection information to the first enterprise user device 106 and/or the second enterprise user device 107 via the communication interface 113 and while the fourth and/or fifth wireless data connections are respectively established. In some instances, the occupancy analysis platform 102 may send the data collection information and the one or more commands directing the first enterprise user device 106 and/or the second enterprise user device 107 to display a data collection interface based on the data collection information prior to a work start time for a particular day (e.g., a day for which resource management information will be generated as described below).

At step 208, the first enterprise user device 106 and/or the second enterprise user device 107 may receive or otherwise access the data collection information and the one or more commands directing the first enterprise user device 106 and/or the second enterprise user device 107 to display a data collection interface based on the data collection information sent at step 207. For example, the first enterprise user device 106 and/or the second enterprise user device 107 may receive the data collection information and the one or more commands directing the first enterprise user device 106 and/or the second enterprise user device 107 to display a data collection interface based on the data collection information while the fourth and/or fifth wireless data connections are respectively established.

At step 209, the first enterprise user device 106 and/or the second enterprise user device 107 may display a data collection prompt (e.g., using the data collection information and based on or in response to the one or more commands directing the first enterprise user device 106 and/or the second enterprise user device 107 to display a data collection interface based on the data collection information. For example, the first enterprise user device 106 and/or the second enterprise user device 107 may display a graphical user interface requesting an unstructured language input corresponding to availability information, task information, or the like, for an individual, as shown in graphical user interface 405, which is shown in FIG. 4 (e.g., prompt the individual to enter text about daily tasks). Additionally or alternatively, the first enterprise user device 106 and/or the second enterprise user device 107 may display a graphical user interface requesting a binary input corresponding to availability, task information, or the like for an individual, as shown in graphical user interface 505, which is shown in FIG. 5 (e.g., prompt the individual to response to a question and answer prompt by selection of a binary yes or no element).

At step 210, the first enterprise user device 106 and/or the second enterprise user device 107 may receive user input corresponding to the data collection prompt displayed at step 209. For example, the first enterprise user device 106 and/or the second enterprise user device 107 may receive an unstructured language input, a binary data input, or the like that provides availability information and/or task information (e.g., tasks to be performed by the individual in the office on a particular day).

Figure 2C:
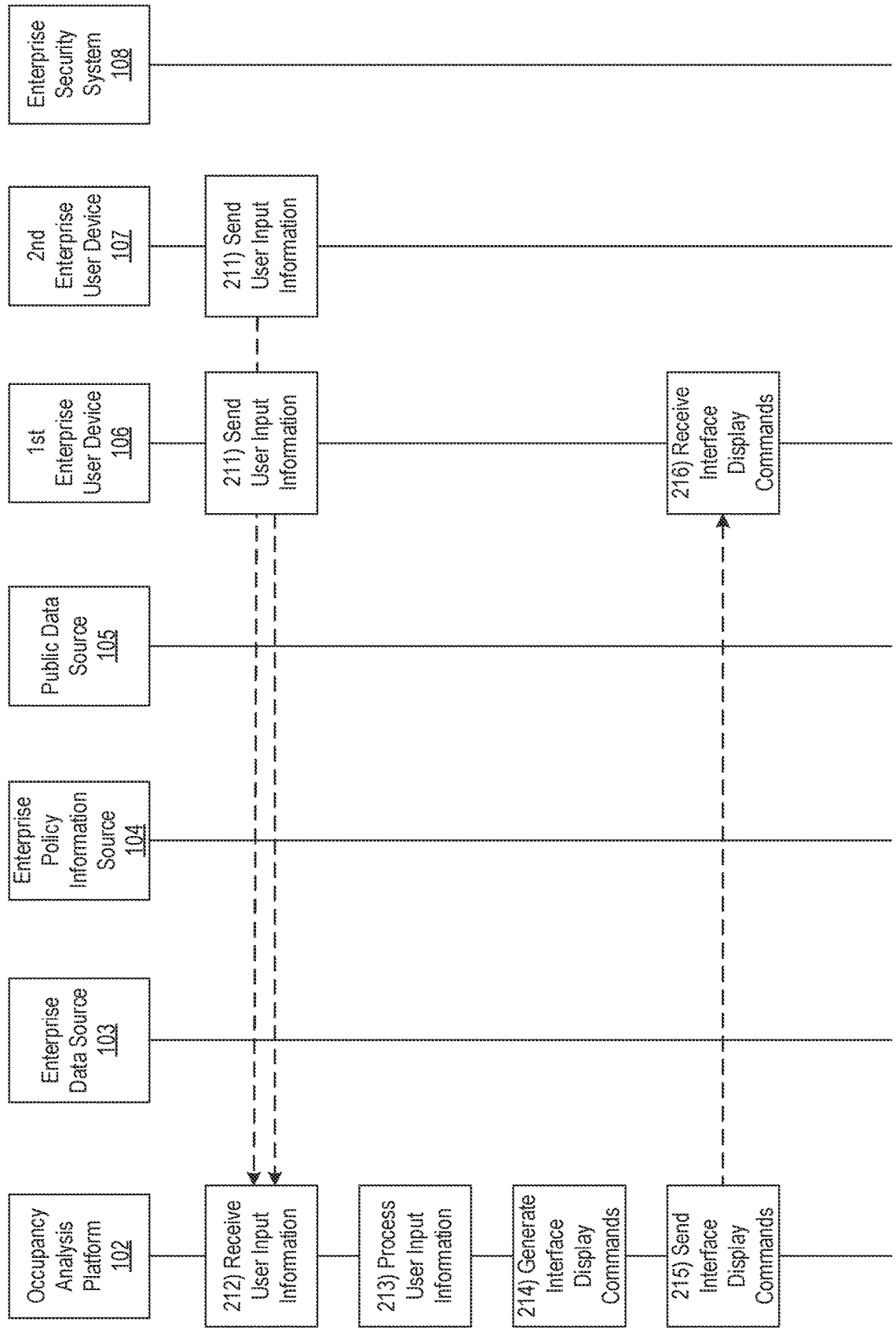
Figure 2D:
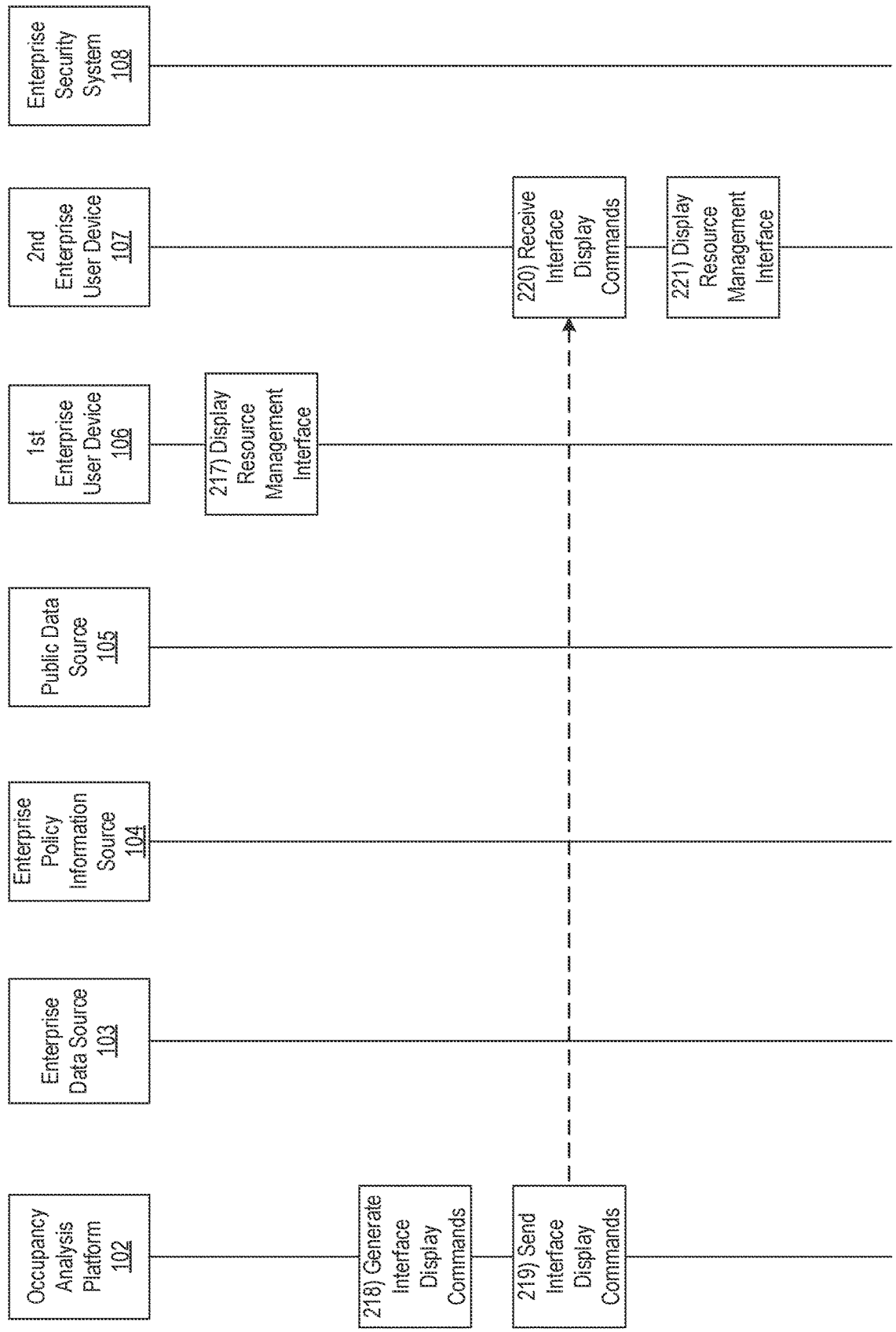

Referring to FIG. 2C, at step 211, the first enterprise user device 106 and/or the second enterprise user device 107 may send, share, or otherwise provide the user input information, received at step 210, to the occupancy analysis platform 102. For example, the first enterprise user device 106 and/or the second enterprise user device 107 may send the user input information to the occupancy analysis platform 102 while the fourth and/or fifth wireless data connections are established.

At step 212, the occupancy analysis platform 102 may receive or otherwise access the user input information sent at step 211. For example, the occupancy analysis platform 102 may receive the user input information via the communication interface 113 and while the fourth and/or fifth wireless data connections are established.

In some instances, the user input information collection process described at steps 207-212 may correspond to a question and answer dialogue between the occupancy analysis platform 102 and the individuals using the first enterprise user device 106 and/or the second enterprise user device 107. In these instances, there may be a plurality of back and forth communications between the occupancy analysis platform 102 and the first enterprise user device 106 and/or the second enterprise user device 107 that resemble the process described in steps 207-212. For example, the occupancy analysis platform 102 may "ask" the first enterprise user device 106 a first question, the first enterprise user device 106 may respond (e.g., based on user input received at the first enterprise user device 106), the occupancy analysis platform 102 may determine and "ask" a second question based on the response to the first question, and the first enterprise user device 106 may respond to the second question (e.g., based on user input received at the first enterprise user device 106). An example exchange between the occupancy analysis platform 102 and the first enterprise user device 106 and/or the second enterprise user device 107 may be: "What do you need to do today?" "I have a meeting in the office." "Who are you meeting with?"

At step 213, the occupancy analysis platform 102 may process the user input information received at step 212. For example, the occupancy analysis platform 102 may process the user input information using natural language processing, natural language understanding, or the like to identify whether or not the individuals should be permitted to physically occupy the physical location. In these instances, the occupancy analysis platform 102 may take into account the enterprise data, internal policy information, and/or public data received at step 203 in processing the user input information. In some instances, the occupancy analysis platform 102 may collect user input information for all of the individuals who may typically occupy a physical space prior to processing the user input information (e.g., from all employees of an enterprise organization). In doing so, the occupancy analysis platform 102 may generate, in real time and for each anticipated occupant for the physical space, resource management information indicating whether or not they should be authorized to occupy the physical space on a given day (e.g., this analysis may be performed each morning before the start of a workday to identify who may occupy the office that day).

For illustrative purposes, the occupancy analysis platform 102 may determine, based on the user input information from the first enterprise user device 106 and the second enterprise user device 107, that the user of the first enterprise user device 106 may occupy the physical space and that the user of the second enterprise user device 107 should not occupy the physical space. For example, the user input information from the first enterprise user device 106 may have indicated "My work cannot be performed from home," or the like. In contrast, the user input information from the second enterprise user device 107 may have indicated "I can work from home," "I'm planning to stay home today," or the like.

In some instances, the occupancy analysis platform 102 may be able to directly sort individuals into "daily occupancy granted" and "daily occupancy denied" categories based only on the user input information. For example, internal enterprise occupancy guidance may indicate that offices should remain at less than 50% occupancy (or some other proposed occupancy threshold) and less than 50% of the employees may indicate that they are available and/or planning to come to work to complete various tasks. In other instances, however, the occupancy analysis platform 102 may prioritize individuals based on the user input information, enterprise data, internal policy information, public data, or the like, so as to not exceed an occupancy threshold (e.g., more than an allowed number of individuals are requesting to come to the office). For example, if two individuals both indicate that they are available and are planning to work from the office, the occupancy analysis platform 102 may prioritize the individuals based on a project scheduling information (e.g., the first individual's project is due today and the second individual's project is due in a month, so prioritize the first individual, or the like; work is happening in a phased approach with the first individual working on a first phase and the second individual working on a second phase, so prioritize the first individual, or the like), job roles (e.g., first individual is more senior, so prioritize the first individual, or the like), task information (e.g., first individual cannot complete his/her work functions from home (e.g., teller, or the like) and second individual can complete his/her work functions from home, so prioritize first individual), office floorplan information (e.g., a third individual, who has been granted access to the office, sits directly next to the first individual, whereas a fourth individual, who sits directly next to the second individual, is not planning to come into the office, so prioritize the second individual), or the like, so as to most effectively allocate resources to the physical space on that particular day. Additionally or alternatively, enterprise wide policies may be factor into this processing (e.g., the enterprise organization sets self-policing guidelines to remain a predetermined distance apart from other individuals, or the like). In some instances, the processing of this user input information may result in resource management information indicating whether or not individuals (e.g., users of first enterprise user device 106, second enterprise user device 107, or the like) may occupy the physical space on a particular day.

In some instances, in processing the user input information, the occupancy analysis platform 102 may apply an overflow threshold corresponding to a threshold occupancy that is less than the maximum permitted occupancy (e.g., if no more than half of the occupants are allowed in a physical space, the overflow threshold may be set at 45%, or the like). When processing the user input information, the occupancy analysis platform 102 may limit an amount of individuals authorized to physically access the physical space to remain below the overflow threshold to support overflow occupancy. For example, the occupancy analysis platform 102 may flag an individual as unauthorized to enter the physical space, but the individual may communicate with the occupancy analysis platform 102 at mid-day requesting access permissions to complete an unanticipated task, or the like. In this example, the overflow occupancy may be able to support the individual without exceeding the maximum permitted occupancy for the physical space.

At step 214, the occupancy analysis platform 102 may generate one or more commands directing the first enterprise user device 106 to display a resource management interface based on the resource management information. At step 215, the occupancy analysis platform 102 may send, share, or otherwise provide the resource management information and the one or more commands directing the first enterprise user device 106 to display a resource management interface based on the resource management information to the first enterprise user device 106. For example, the occupancy analysis platform 102 may send the resource management information and the one or more commands directing the first enterprise user device 106 to display a resource management interface based on the resource management information via the communication interface 113 and while the fourth wireless data connection is established.

At step 216, the first enterprise user device 106 may receive or otherwise access the resource management information and the or more commands directing the first enterprise user device 106 to display a resource management interface based on the resource management information. For example, the first enterprise user device 106 may receive the resource management information and the one or more commands directing the first enterprise user device 106 to display a resource management interface based on the resource management information while the fourth wireless data connection is established.

At step 217, the first enterprise user device 106 may display a resource management interface based on the resource management information (e.g., based on or in response to the or more commands directing the first enterprise user device 106 to display a resource management interface based on the resource management information). For example, the first enterprise user device 106 may display a graphical user interface similar to graphical user interface 605, which is shown in FIG. 6, indicating that the user of the first enterprise user device 106 has been cleared to occupy the physical space today (e.g., a first day).

At step 218, the occupancy analysis platform 102 may generate one or more commands directing the second enterprise user device 107 to display a resource management interface based on the resource management information. At step 219, the occupancy analysis platform 102 may send, share, or otherwise provide the resource management information and the one or more commands directing the second enterprise user device 107 to display a resource management interface based on the resource management information. In some instances, the occupancy analysis platform 102 may send, share, or otherwise provide the resource management information and the one or more commands directing the second enterprise user device 107 to display a resource management interface based on the resource management information via the communication interface 113 and while the fifth wireless data connection is established.

At step 220, the second enterprise user device 107 may receive or otherwise access the resource management information and the one or more commands directing the second enterprise user device 107 to display a resource management interface based on the resource management information. For example, the second enterprise user device 107 may receive the resource management information and the one or more commands directing the second enterprise user device 107 to display a resource management interface based on the resource management information while the fifth wireless data connection is established.

At step 221, the second enterprise user device 107 may display a resource management interface based on the resource management information (e.g., based on or in response to the one or more commands directing the second enterprise user device 107 to display a resource management interface based on the resource management information). For example, the second enterprise user device 107 may display a graphical user interface similar to graphical user interface 705, which is shown in FIG. 7, which may indicate that the user of the second enterprise user device 107 is not authorized to occupy the physical space today (e.g., a first day).

Figure 2E:
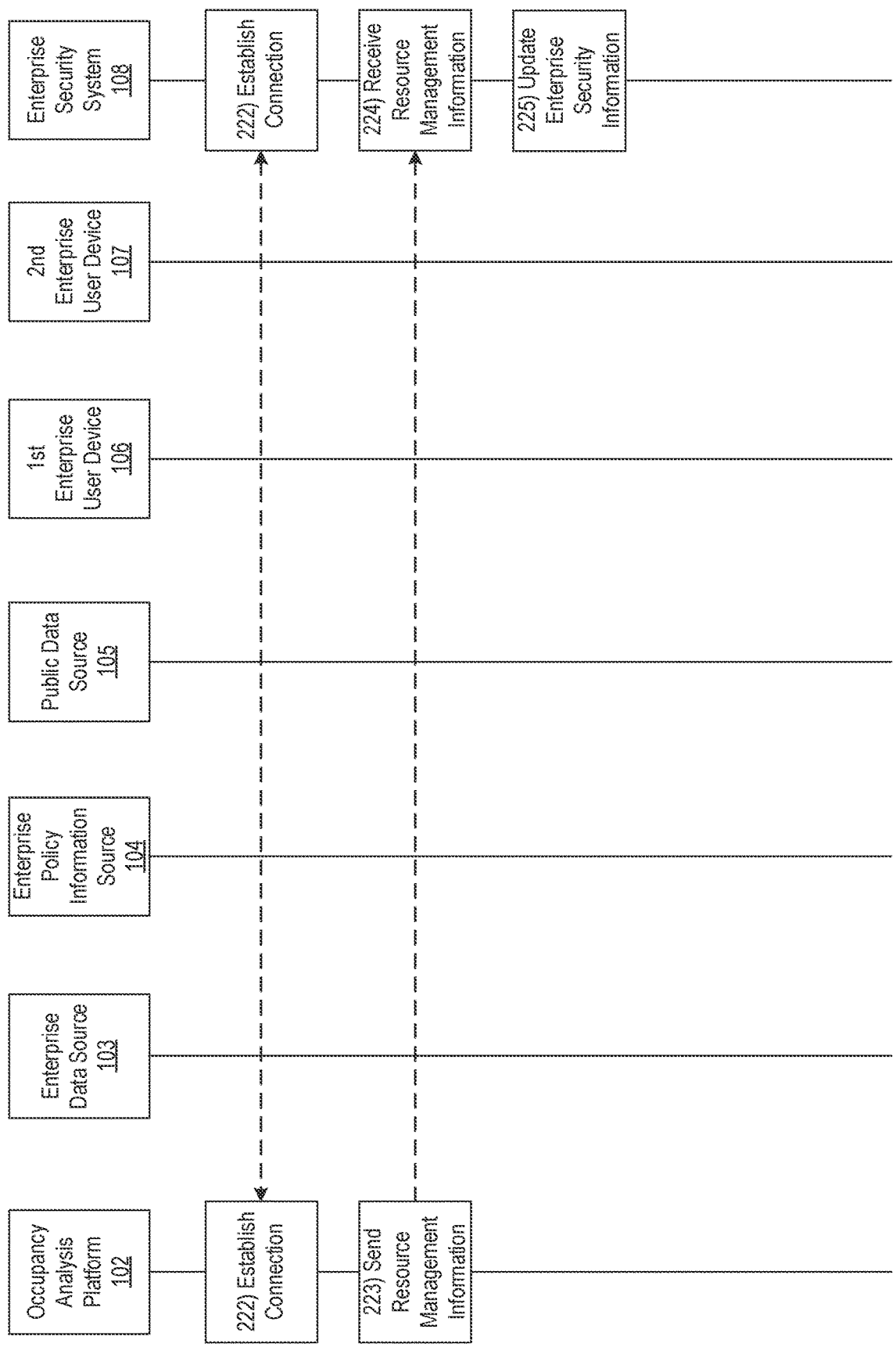

Referring to FIG. 2E, at step 222, the occupancy analysis platform 102 may establish a connection with the enterprise security system 108. For example, the occupancy analysis platform 102 may establish a sixth wireless data connection with the enterprise security system 108 to link the occupancy analysis platform 102 to the enterprise security system 108 (e.g., in preparation for sending the resource management information).

At step 223, the occupancy analysis platform 102 may send, share, or otherwise provide the resource management information and one or more commands directing the enterprise security system 108 to update the enterprise security information (e.g., one or more security records, permissions, authorizations, or the like corresponding to the user of the second enterprise user device 107) based on the resource management information. In some instances, the occupancy analysis platform 102 may send the resource management information and the one or more commands directing the enterprise security system 108 to update the enterprise security information based on the resource management information via the communication interface 113 and while the sixth wireless data connection is established.

At step 224, the enterprise security system 108 may receive or otherwise access the resource management information and the one or more commands directing the enterprise security system 108 to update the enterprise security information based on the resource management information. In some instances, the enterprise security system 108 may receive the one or more commands directing the enterprise security system 108 to update the enterprise security information based on the resource management information while the sixth wireless data connection is established.

At step 225, the enterprise security system 108 may update enterprise security information based on the resource management information (e.g., based on or in response to the one or more commands directing the enterprise security system 108 to update the enterprise security information based on the resource management information). For example, by updating the enterprise security information, the enterprise security system 108 may cause one or more RFID badge access sensors in the physical space to deny access based on presentation of an RFID badge corresponding to the user of the second enterprise user device 107 on a particular day (e.g., the user might not be able to badge into the physical space that day). For example, the enterprise security information may indicate whether or not an individual has valid permission to badge into the physical space on the particular day, and may be used to deny or grant access to the physical space. In some instances, in updating the enterprise security information, the enterprise security system 108 may update the enterprise security information to indicate that the user of the second enterprise user device 107 (e.g., who may typically have access to the physical space) does not have valid permission to badge into the physical space during on this particular day. In these instances, the enterprise security system may temporarily deactivate authentication permissions for a badge of the user of the second enterprise user device 107 during the particular day.

Figure 3:
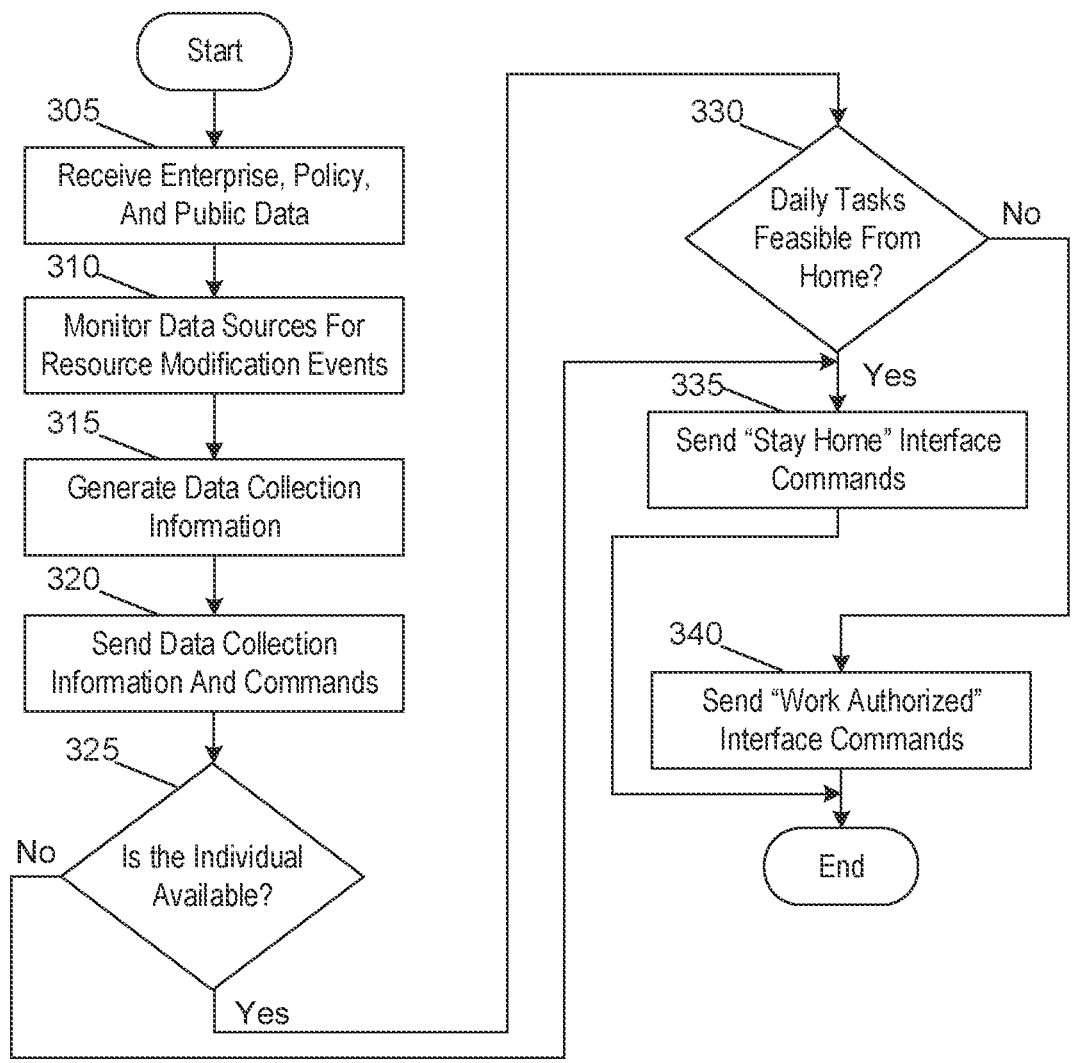
FIG. 3 depicts an illustrative method for implementing machine learning for real time occupancy forecasting and resource planning in accordance with one or more example embodiments.

FIG. 3 depicts an illustrative method for implementing machine learning for real time occupancy forecasting and resource planning in accordance with one or more example embodiments. Referring to FIG. 3, at step 305, a computing platform having at least one processor, a communication interface, and memory may receive enterprise data, internal policy information, and/or public data from one or more data sources. At step 310, the computing platform may monitor the one or more data sources to detect a resource modification event. At step 315, once a resource modification event is detected, the computing platform may generate data collection information. At step 320, the computing platform may send the data collection information and one or more commands directing an enterprise user device to display a data collection interface. At step 325, the computing platform may receive user input information and may identify based on the user input information if an individual is available. If the individual is not available, the computing platform may proceed to step 335. If the individual is available, the computing platform may proceed to step 330.

At step 330, the computing platform may identify, based on the user input information, if the individual may complete his or her daily work from home. If the individual cannot complete his or her work from home, the computing platform may proceed to step 340. If the individual can complete his or her work from home, the computing platform may proceed to step 335.

At step 335, the computing platform may send one or more commands directing the enterprise user device to display a user interface indicating that the individual is not authorized to occupy a physical space. At step 340, the computing platform may send one or more commands directing the enterprise user device to display a user interface indicating that the individual is authorized to occupy the physical space.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
monitor one or more data sources to detect an occupancy modification event corresponding to a physical space;
based on detecting the occupancy modification event, send data collection information and one or more commands directing one or more end user devices to display a data collection prompt based on the data collection information to the one or more end user devices, wherein the data collection prompt prompts for user input indicating task information indicating work to be performed by users of enterprise applications on the one or more end user devices in the physical space during a first day;

receive user input information indicating the task information indicating the work to be performed by the users of the one or more end user devices in the physical space during the first day;

analyze, using natural language processing (NLP), the user input information and other stored occupancy data, wherein analyzing the user input information and the other stored occupancy data results in resource management information indicating whether or not the users of the one or more end user devices have valid permission to occupy the physical space during the first day; and send, to an enterprise security system, the resource management information and one or more commands directing the enterprise security system to update enterprise security information based on the resource management information, wherein sending the resource management information and the one or more commands directing the enterprise security system to update enterprise security information based on the resource management information may cause one or more radio frequency identification (RFID) badge access sensors to deny access, to the physical space, to one or more of the users.

2. The computing platform of claim 1, wherein the occupancy modification event comprises enterprise guidelines for office occupancy.

3. The computing platform of claim 1, wherein sending the data collection information and the one or more commands directing the one or more end user devices to display the data collection prompt based on the data collection information comprises sending the data collection information and the one or more commands directing the one or more end user devices to display the data collection prompt based on the data collection information prior to arrival at the physical space for the first day.

4. The computing platform of claim 1, wherein the data collection prompt further prompts for user input indicating availability information for users of the one or more end user devices.

5. The computing platform of claim 1, wherein receiving the user input information comprises:
receiving first user input at a first data collection prompt;
determining a second data collection prompt based on the first user input;
displaying the second data collection prompt; and
receiving a second user input at the second data collection prompt.

6. The computing platform of claim 5, wherein the first user input and the second user input are formatted as unstructured language information.

7. The computing platform of claim 1, wherein analyzing the other stored occupancy comprises analyzing one or more of: project scheduling information, job roles, task information, or office floor plan information.

8. The computing platform of claim 1, wherein the memory stores additional computer-readable instructions that, when executed by the at least one processor, further cause the computing platform to:
send, to the enterprise security system, the resource management information and one or more commands directing the enterprise security system to update enterprise security information based on the resource management information, wherein sending the one or more commands directing the enterprise security system to update the enterprise security information based on the resource management information causes the enterprise security system to update the enterprise security information, wherein the enterprise security information indicates whether or not the users of the one or more end user devices have valid permission to badge into the physical space during the first day.

9. The computing platform of claim 8, wherein the enterprise security information indicates that a first user does not have valid permission to badge into the physical space during the first day, and wherein the enterprise security system temporarily deactivates authentication permissions for a badge for the first user during the first day.

10. The computing platform of claim 1, wherein the memory stores additional computer-readable instructions that, when executed by the at least one processor, further cause the computing platform to:
send, to the one or more end user devices, the resource management information and one or more commands directing the one or more end user devices to display a resource management interface, wherein:
sending the resource management information and the one or more commands directing the one or more end user devices to display the resource management interface causes the one or more end user devices to display the resource management interface, and
the resource management interface indicates whether or not the users of the one or more end user devices have valid permission to physically occupy the physical space during the first day.

11. A method comprising:
at a computing platform comprising at least one processor, a communication interface, and memory:
monitoring one or more data sources to detect an occupancy modification event corresponding to a physical space;
based on detecting the occupancy modification event, sending data collection information and one or more commands directing one or more end user devices to display a data collection prompt based on the data collection information to the one or more end user devices, wherein the data collection prompt prompts for user input indicating task information indicating work to be performed by users of enterprise applications on the one or more end user devices in the physical space during a first day;
receiving user input information indicating the task information indicating the work to be performed by the users of the one or more end user devices in the physical space during the first day;
analyzing, using natural language processing (NLP), the user input information and other stored occupancy data, wherein analyzing the user input information and the other stored occupancy data results in resource management information indicating whether or not the users of the one or more end user devices have valid permission to occupy the physical space during the first day; and
sending, to an enterprise security system, the resource management information and one or more commands directing the enterprise security system to update enterprise security information based on the resource management information, wherein sending the resource management information and the one or more commands directing the enterprise security system to update enterprise security information based on the resource management information may cause one or more RFID badge access sensors to deny access, to the physical space, to one or more of the users.

12. The method of claim 11, wherein the occupancy modification event comprises enterprise guidelines for office occupancy.

13. The method of claim 11, wherein sending the data collection information and the one or more commands directing the one or more end user devices to display the data collection prompt based on the data collection information comprises sending the data collection information and the one or more commands directing the one or more end user devices to display the data collection prompt based on the data collection information prior to arrival at the physical space for the first day.

14. The method of claim 11, wherein the data collection prompt further prompts for user input indicating availability information for users of the one or more end user devices.

15. The method of claim 11, wherein receiving the user input information comprises:
  receiving first user input at a first data collection prompt;
  determining a second data collection prompt based on the first user input;
  displaying the second data collection prompt; and
  receiving a second user input at the second data collection prompt.

16. The method of claim 15, wherein the first user input and the second user input are formatted as unstructured language information.

17. The method of claim 11, wherein analyzing the other stored occupancy comprises analyzing one or more of: project scheduling information, job roles, task information, or office floorplan information.

18. The method of claim 11, further comprising:
  sending, to the enterprise security system, the resource management information and one or more commands directing the enterprise security system to update enterprise security information based on the resource management information, wherein sending the one or more commands directing the enterprise security system to update the enterprise security information based on the resource management information causes the enterprise security system to update the enterprise security information, wherein the enterprise security information indicates whether or not the users of the one or more end user devices have valid permission to badge into the physical space during the first day.

19. The method of claim 18, wherein the enterprise security information indicates that a first user does not have valid permission to badge into the physical space during the first day, and wherein the enterprise security system temporarily deactivates authentication permissions for a badge for the first user during the first day.

20. One or more non-transitory computer-readable media storing instructions that, when executed by a computing platform comprising at least one processor, a communication interface, and memory, cause the computing platform to:
  monitor one or more data sources to detect an occupancy modification event corresponding to a physical space;
  based on detecting the occupancy modification event, send data collection information and one or more commands directing one or more end user devices to display a data collection prompt based on the data collection information to the one or more end user devices, wherein the data collection prompt prompts for user input indicating task information indicating work to be performed by users of enterprise applications on the one or more end user devices in the physical space during a first day;
  receive user input information indicating the task information indicating the work to be performed by the users of the one or more end user devices in the physical space during the first day;
  analyze, using natural language processing (NLP), the user input information and other stored occupancy data, wherein analyzing the user input information and the other stored occupancy data results in resource management information indicating whether or not the users of the one or more end user devices have valid permission to occupy the physical space during the first day; and
  send, to an enterprise security system, the resource management information and one or more commands directing the enterprise security system to update enterprise security information based on the resource management information, wherein sending the resource management information and the one or more commands directing the enterprise security system to update enterprise security information based on the resource management information may cause one or more RFID badge access sensors to deny access, to the physical space, to one or more of the users.

* * * * *